US011646676B2

(12) United States Patent
Hart et al.

(10) Patent No.: US 11,646,676 B2
(45) Date of Patent: May 9, 2023

(54) METHOD AND APPARATUS FOR GENERATING A THREE-PHASE VOLTAGE

(71) Applicant: YASA LIMITED, Kidlington (GB)

(72) Inventors: Simon David Hart, Powys (GB); Samuel David Ahearn, Montgomery (GB)

(73) Assignee: YASA LIMITED, Kidlington (GB)

( * ) Notice: Subject to any disclaimer, the term of this patent is extended or adjusted under 35 U.S.C. 154(b) by 0 days.

(21) Appl. No.: 17/556,273

(22) Filed: Dec. 20, 2021

(65) Prior Publication Data

US 2022/0200436 A1 Jun. 23, 2022

(30) Foreign Application Priority Data

Dec. 23, 2020 (GB) ..................................... 2020501

(51) Int. Cl.
*H02M 7/5387* (2007.01)
*H02M 7/537* (2006.01)
*H02M 1/00* (2006.01)

(52) U.S. Cl.
CPC ..... *H02M 7/53876* (2021.05); *H02M 1/0029* (2021.05); *H02M 7/537* (2013.01)

(58) Field of Classification Search
CPC ............. H02M 7/53876; H02M 7/537; H02M 7/5395; H02M 1/0029
See application file for complete search history.

(56) References Cited

U.S. PATENT DOCUMENTS

| | | | | |
|---|---|---|---|---|
| 8,605,461 B2* | 12/2013 | Hibino | .............. | H02M 7/53875 363/40 |
| 8,958,222 B2 | 2/2015 | Hart | | |
| 9,537,427 B2* | 1/2017 | Jiang | .................... | H02M 7/5395 |
| 10,505,529 B1* | 12/2019 | Takao | ...................... | H02M 1/08 |
| 2012/0113701 A1* | 5/2012 | Wang | ................. | H02M 7/53875 363/132 |
| 2019/0280609 A1 | 9/2019 | Liu et al. | | |

FOREIGN PATENT DOCUMENTS

CN 109495004 A 3/2019

OTHER PUBLICATIONS

UK Intellectual Property Office. Search Report issued in Application No. GB2020501.9. dated Jun. 17, 2021. 4 pages.

* cited by examiner

*Primary Examiner* — Jue Zhang
(74) *Attorney, Agent, or Firm* — Meunier Carlin & Curfman LLC

(57) ABSTRACT

A modulation technique is described in which a controller modulates the output AC voltages to introduce an offset to the phase that is most positive or most negative such that the phase is clamped to the +dc supply when the respective phase is most positive and to the −dc supply rail when most negative. The offset is provided by introducing a common mode component voltage to all of the phases over a plurality of output angle segments. In order to reduce the Noise Vibration and Harshness (NVH) and EMI, the common mode component voltage amplitude is varied over the output angles within the respective segment between a minimum and a maximum in order to control a slew rate of the rising or falling edges of the three phase AC output voltages.

21 Claims, 7 Drawing Sheets

METHOD AND APPARATUS FOR GENERATING A THREE-PHASE VOLTAGE

CROSS-REFERENCE TO RELATED APPLICATIONS

This application claims priority to and benefit of GB Application No. 2020501.9, filed Dec. 23, 2020, which is incorporated by reference in its entirety.

FIELD OF THE INVENTION

The present invention relates to a method of generating a three-phase voltage, and an apparatus for generating a three-phase voltage. In particular, the present invention relates to a method of generating a three-phase voltage, and an apparatus for generating a three-phase voltage for driving a load, such as an electric motor, and an inverter for driving a load such as an electric motor, or heater or any other type of electrical load.

BACKGROUND OF THE INVENTION

Power inverters are generally known. One example may be found in U.S. Pat. No. 8,958,222, from which FIG. 1 is taken, and shows a three phase power inverter 100 for converting a DC power supply 101 to an AC output 103 which may then be connected to a load (not shown). The inverter comprises three separate phases 200, 300, 400 (also referred to as phases U, V, W respectively). Each phase includes two switches in series: 200a, 200b in phase 200/U; 300a, 300b in phase 300/V; and 400a, 400b in phase 400/W. Switches 200a, 300a and 400a are connected to the positive rail 105 (and may be referred to as the "upper" switches) and switches 200b, 300b and 400b are connected to the negative rail 107 (and may be referred to as the "lower" switches). In FIG. 1, each switch may be an IGBT (insulated gate bipolar transistor) and, for each IGBT, an associated anti-parallel diode may be used (not shown). However, any switches with fast switching capability may be used. A control system (such as a processor) (not shown) controls the switching of the switches 200a, 200b, 300a, 300b, 400a, 400b to control the AC output of the inverter 100. The power inverter also includes a DC bus capacitor 102, which provides a more stable DC voltage, limiting fluctuations as the inverter sporadically demands heavy current.

A sinusoidal output current can be created at AC output 103 by a combination of switching states of the six switches. However, the inverter 100 must be controlled so that the two switches in the same phase are never switched on at the same time, so that the DC supply 101 is not short circuited. Thus, if 200a is on, 200b must be off and vice versa; if 300a is on, 300b must be off and vice versa; and if 400a is on, 400b must be off and vice versa. This results in eight possible switching vectors for the inverter, as shown in Table 1. In Table 1, the vector values are the states of the three upper switches 200a, 300a, 400a, with the three lower switches 200b, 300b, 400b necessarily taking the opposite state to avoid shorting out the DC supply.

| Vector | 200a | 300a | 400a | 200b | 300b | 400b | $V_{UW}$ | $V_{WV}$ | $V_{VU}$ | |
|---|---|---|---|---|---|---|---|---|---|---|
| $V_0 = \{000\}$ | OFF | OFF | OFF | ON | ON | ON | 0 | 0 | 0 | Zero |
| $V_1 = \{100\}$ | ON | OFF | OFF | OFF | ON | ON | $+V_{dc}$ | 0 | $-V_{dc}$ | Active |
| $V_2 = \{110\}$ | ON | ON | OFF | OFF | OFF | ON | 0 | $+V_{dc}$ | $-V_{dc}$ | Active |
| $V_3 = \{010\}$ | OFF | ON | OFF | ON | OFF | ON | $-V_{dc}$ | $+V_{dc}$ | 0 | Active |
| $V_4 = \{011\}$ | OFF | ON | ON | ON | OFF | OFF | $-V_{dc}$ | 0 | $+V_{dc}$ | Active |
| $V_5 = \{001\}$ | OFF | OFF | ON | ON | ON | OFF | 0 | $-V_{dc}$ | $+V_{dc}$ | Active |
| $V_6 = \{101\}$ | ON | OFF | ON | OFF | ON | OFF | $+V_{dc}$ | $-V_{dc}$ | 0 | Active |
| $V_7 = \{111\}$ | ON | ON | ON | OFF | OFF | OFF | 0 | 0 | 0 | Zero |

FIG. 2 shows the six active vectors and the two zero voltage vectors of Table 1 graphically portrayed in an inverter voltage switching hexagon. Such vectorial representation of three-phase systems is well known to the skilled person and will not be described in detail. However, in general, any three-phase system can be represented uniquely by a rotating vector $V_s$, as shown in FIG. 2. The rotating vector $V_s$ comprises components of the six active vectors shown in Table 1 and FIG. 2. This is known as Space Vector Modulation (SWM). The voltage at the AC output 103 can be changed by varying the ratio between the zero voltage vectors $V_0$ and $V_7$ and the active vector $V_S$ (comprising components of $V_1$ to $V_6$) (the modulation index) by pulse width modulation (PWM) techniques.

FIG. 3 shows an example of pulse width space vector modulation over one switching period according to the prior art. The switching function for each switch 200a, 300a, 400a is a time waveform taking the value 1 when the switch is on and 0 when the switch is off. Referring to FIG. 3, during the first period t0/2, all three switches 200a, 300a, 400a are off (value 0) which produces vector $V_O$ of Table 1. $V_O$ is a zero-voltage vector, so this time period is an inactive period. In the second period t1, switch 200a takes the value 1 and switches 300a and 400a take the value 0, which produces vector $V_1$, which is an active vector. In the third period t2, switches 200a and 300a take the value 1 and switch 400a takes the value 0, which produces vector $V_2$, which is also an active vector. Finally, during the fourth period t0/2, all three switches 200a, 300a, 400a are on (value 1) which produces zero voltage vector $V_7$ of Table 1. Thus, the active periods are t1 and t2 and the inactive period is t0. The ratio between the total active period (in this case, t1+t2) and total inactive period (in this case, t0/2+t0/2=t0) determines the output voltage at the AC output.

FIG. 4 shows phase voltages (with respect to the 0V line shown in FIG. 1, which is half of the dc bus) with symmetric switching versus output voltage angle (with a DC bus of 250V and a 200V peak demand). FIG. 5 shows the resulting line to line voltage as seen by the motor load.

Within an inverter, switching losses can start to dominate losses at lower power outputs. This is particularly true with SiC and other wide bandgap devices that have very low conductive losses. These switching losses to some extent can be reduced if the number of switch transition edges per second is reduced.

Prior art techniques utilise a scheme called "Bus clamping", use pulse drops and pulse extensions within each PWM period to reduce the number of switching instances. These methods can reduce switching events to ⅔ that of SVM which directly scales to a 33% reduction in switching losses. However, the major disadvantage of these bus clamping methods is that they introduce sharp edges into to the phase voltages that in turn cause a higher level of noise, vibration and harshness (NVH), and also increased EMI.

FIG. 6 illustrates the prior art bus clamping technique. The figure shows one output frequency wave of standard Space Vector Modulation (SVM) The upper plot is the phase voltage and the lower plot is the resulting line to line voltage as seen by the electrical load.

In this technique, the controller offsets (that is, clamps the output voltage to the supply rail) an output phase voltage when a phase is most positive or most negative with respect to other phases. The offset is to the +dc supply rail when it is the most positive, and to −dc supply rail when it is the most negative. The offsets are provided by introducing a common component voltage which is added to all phases. Since the common component voltage is added to all phases, the common component is removed when measuring between phases, so the load still sees a sinusoidal voltage.

When a phase is clamped to either the positive or negative dc bus it can stop switching. In the case of clamping to positive dc bus, the upper switch of the phase is always on (pulse extension) and the lower switch is always off (pulse dropping). The phase switches stop transitioning (stop switch) so the switching loss reduces to zero for that phase. The other phases continue to switch so the effective reduction in switching loss is ⅓.

As the output wave angle moves through one cycle, each phase in turn is damped. Each phase spends a ⅙$^{th}$ of the output wave damped to the positive bus and a ⅙$^{th}$ to the negative bus in symmetrical bus damping.

However, as mentioned above, such prior art techniques result in increased NVH and EMI. We have therefore appreciated the need for an improved method of generating a three-phase AC output voltage.

SUMMARY OF THE INVENTION

The present invention therefore provides a method of generating a three-phase output voltage, and an inverter for generating a three-phase output voltage, for driving an electrical load in accordance with the independent claims appended hereto.

Further advantageous embodiments r also provided in accordance with the dependent claims, also appended hereto.

We describe a method of generating a three-phase voltage for powering an electrical load, the method comprising: receiving an input voltage from a voltage source and controlling a plurality of switches, using Pulse Width Modulation (PWM) over a plurality of PWM periods, to generate a three phase AC output for an electrical load, the input voltage having a positive supply rail voltage and a negative supply rail voltage, each of the three phase AC outputs having an amplitude and angle that varies over a plurality of segments, each segment representing a period of angular position, and wherein each of the three phase AC outputs are offset from one another in angle; for each segment: identify which of the three phase AC output voltages approaching the positive supply rail has the most positive voltage, or which of the three AC output voltages approaching the negative supply rail has the most negative voltage; control the plurality of switches to apply a common mode component voltage to each of the three phases within the respective segment, the common mode component voltage having a maximum amplitude that is sufficient to clamp the respective identified phase voltage to the respective positive supply rail or the respective negative supply rail, wherein the common mode component voltage amplitude is varied over the angle within the respective segment between a minimum value and the maximum value, and wherein varying the common mode component voltage amplitude controls a slew rate of respective rising or respective falling edges of the three phase AC output voltages.

The above technique, referred to herein as Slew Controlled Edge Reduction (SCER), enables the rising and falling edges between the underlying modulation scheme (for example SVM) and the clamping scheme (where the output voltages are clamped in turn to the positive and negative supply rails) to be softened controllably to reduce the NVH and EMI issues often associated with the pure clamping technique.

The common mode component voltage may be varied over the angle within the respective segment between the minimum value and the maximum value using a slew value, the slew value comprising a variable scalar value ranging between a respective minimum slew value and a respective maximum slew value within the respective segment. The slew value may be varied between its minimum and maximum values dependent on the AC output angular position within each segment.

The slew value is preferably below its maximum value for a portion of the segment coinciding with a portion of the respective rising or the respective falling edge of the identified phase AC output. The slew value is preferably at its maximum value for a portion of the segment to clamp the identified phase AC output to the respective positive supply rail or the respective negative supply rail.

The transition of the slew value between its minimum and maximum values may have a shape defined by a portion of a circular function.

In the methods where the shape is defined by a portion of a circular function, for an AC output voltage angular position within a first section of the respective segment, the segment having 30° of angular positions, the slew value may have a magnitude defined by a rising portion of a sinusoid between its minimum value and its maximum value over the first section.

The duration of the first section of the segment may be based on a Slew Factor, the Slew Factor being a scalar value to control the duration of the transition between the minimum and maximum values. The first section may be defined by the AC output voltage having a product of its angular position and the Slew Factor having an angle that is less than 30°.

The slew value over the first section may be defined by a sinusoid having a period that is defined as a product of 6 times the electrical frequency of the AC output voltage and the Slew Factor. The slew value over the first section may be defined by:

Slew Value=−0.5*cos(6*(SlewFactor*γ))+0.5

Where γ defines the AC output voltage angular position.

The Slew Factor value may be chosen from a plurality of values based on a modulation index and/or an output frequency of the output AC voltage.

When the slew value has a maximum value for a second section of the respective segment, the first and second sections may be consecutive.

In the methods where the shape is defined by a portion of a circular function, for an AC output voltage angular position within a first section of the respective segment, the segment having 30° of angular positions, the slew value may have a maximum value for the first section. The slew value may have a shape defined by a falling portion of a sinusoid between its maximum value and its minimum value over the second section, wherein the first and second sections are consecutive.

The duration of the second section may be based on a Slew Factor, the Slew Factor being a scalar value to control the duration of the transition between the minimum and maximum values.

The slew value over the second section may be defined by a sinusoid having a period that is defined as a product of 6 times the electrical frequency of the AC output voltage and the Slew Factor. The sinusoid may be phase shifted.

The slew value may be defined by:

$$SlewValue = 0.5*\cos(6*(SlewFactor*(\gamma - SlewOffset))) + 0.5$$

Where γ defines the AC output voltage angular position, and SlewOffset is a starting angle of the second section.

The starting angle of the second section may be defined by the AC output voltage having an angular position that is greater than a difference between the duration of a segment and a quotient of the duration of a segment and the Slew Factor.

The Slew Factor value may be chosen from a plurality of values based on a modulation index and/or output frequency of the output AC voltage.

As an alternative to the sinusoidal shaped Slew Value, the transition of the slew value between its minimum and maximum values may occurs linearly, exponentially, or logarithmically.

In any of the above, the common mode component voltage may be applied when a modulation index and/or the output frequency of the output voltage is greater than a threshold.

We also describe an inverter for generating a three-phase voltage for powering an electrical load, the inverter comprising: an input for receiving input voltages, the input voltage having a positive supply rail voltage and a negative supply rail voltage; three AC outputs, one per phase, for outputting a three phase AC output voltage for powering an electrical load; a plurality of switches connected between the input voltages and the three AC outputs and being arranged to generate the three AC output voltages; a controller coupled to the plurality of switches for controlling the plurality of switches, using Pulse Width Modulation (PWM) over a plurality of PWM periods, to generate a three phase AC output for the electrical load, each of the three phase AC outputs having an amplitude and angle that varies over a plurality of segments, each segment representing a period of angular position, and wherein each of the three phase AC outputs are offset from one another in angle; wherein the controller is configured to: for each segment: identify which of the three phase AC output voltages approaching the positive supply rail has the most positive voltage, or which of the three AC output voltages approaching the negative supply rail has the most negative voltage; control the plurality of switches to apply a common mode component voltage to each of the three phases within the respective segment, the common mode component voltage having a maximum amplitude that is sufficient to clamp the respective identified phase voltage to the respective positive supply rail or the respective negative supply rail, wherein the common mode component voltage amplitude is varied over the angle within the respective segment between a minimum value and the maximum value, and wherein varying the common mode component voltage amplitude controls a slew rate of respective rising or respective falling edges of the three phase AC output voltages.

As with the method, the SCER technique enables the rising and falling edges between the underlying modulation scheme (for example SVM) and the clamping scheme (where the output voltages are damped in turn to the positive and negative supply rails) to be softened controllably to reduce the NVH and EMI issues often associated with the pure clamping technique.

The common mode component voltage may be varied over the angle within the respective segment between the minimum value and the maximum value using a slew value, the slew value comprising a variable scalar value ranging between a respective minimum slew value and a respective maximum slew value within the respective segment.

The controller may vary the slew value between its minimum and maximum values dependent on the AC output angular position within each segment.

The slew value may be below its maximum value for a portion of the segment coinciding with a portion of the respective rising or the respective falling edge of the identified phase AC output. The slew value may be at its maximum value for a portion of the segment to clamp the identified phase AC output to the respective positive supply rail or the respective negative supply rail.

The controller may control the transition of the slew value between its minimum and maximum values using a shape defined by a portion of a circular function.

For an AC output voltage angular position within a first section of the respective segment, the segment having 30° of angular positions, the controller may controls the slew value to have a magnitude defined by a rising portion of a sinusoid between its minimum value and its maximum value over the first section.

The controller may control the duration of the first section of the segment based on a Slew Factor, the Slew Factor being a scalar value to control the duration of the transition between the minimum and maximum values. The first section may be defined by the AC output voltage having a product of its angular position and the Slew Factor having an angle that is less than 30°.

The controller may control the slew value over the first section defined by a sinusoid having a period that is defined as a product of 6 times the electrical frequency of the AC output voltage and the Slew Factor.

The controller may controls the slew value over the first section using:

$$SlewValue = -0.5*\cos(6*(SlewFactor*\gamma)) + 0.5$$

Where γ defines the AC output voltage angular position.

The controller may select the Slew Factor value from a plurality of values based on a modulation index and/or an output frequency of the output AC voltage.

The controller may control the slew value to have a maximum value for a second section of the respective segment, the first and second sections being consecutive.

For an AC output voltage angular position within a first section of the respective segment, the segment having 30° of angular positions, the controller may control the slew value to have a maximum value for the first section. The controller may control the slew value to have a shape defined by a falling portion of a sinusoid between its maximum value and its minimum value over the second section, wherein the first and second sections are consecutive.

The controller may control the duration of the second section based on a Slew Factor, the Slew Factor being a scalar value to control the duration of the transition between the minimum and maximum values.

The controller may control the slew value over the second section defined by a sinusoid having a period that is defined as a product of 6 times the electrical frequency of the AC output voltage and the Slew Factor. The sinusoid may be phase shifted.

The controller may controls the slew value using:

$$\text{SlewValue}=0.5*\cos(6*(\text{SlewFactor}*(\gamma-\text{SlewOffset})))+0.5$$

Where $\gamma$ defines the AC output voltage angular position, and SlewOffset is a starting angle of the second section.

The starting angle of the second section may be defined by the AC output voltage having an angular position that is greater than a difference between the duration of a segment and a quotient of the duration of a segment and the Slew Factor.

The controller may select the Slew Factor value from a plurality of values based on a modulation index and/or output frequency of the output AC voltage.

In an alternative to the shape of the slew being defined by a circular function, the controller may control the transition of the slew value between its minimum and maximum values linearly, exponentially, or logarithmically.

The controller may apply the common mode component voltage when a modulation index and/or the output frequency of the output voltage is greater than a threshold.

In any of the above, the electrical load may comprise an electric motor or generator, or other electrical loads such as heaters and the like. The method is suitable for any type of load requiring an AC input.

LIST OF FIGURES

The present invention will now be described, by way of example only, and with reference to the accompanying figures, in which.

DETAILED DESCRIPTION OF THE PREFERRED EMBODIMENTS

In brief, we describe a modulation technique in which a controller modulates the output AC voltages to introduce an offset to the phase that is most positive or most negative such that the phase is clamped to the +dc supply when the respective phase is most positive and to the −dc supply rail when most negative. The offset is provided by introducing a common mode component voltage to all of the phases over a plurality of output angle segments. In order to reduce the NVH and EMI, the common mode component voltage amplitude is varied over the output angles within the respective segment between a minimum and a maximum in order to control a slew rate of the rising or falling edges of the three phase AC output voltages.

By introducing a slew to the rising and falling edges of the AC output voltages, this reduces the NVH and EMI as the harsh transitions to the supply rails are softened.

Figure 7:
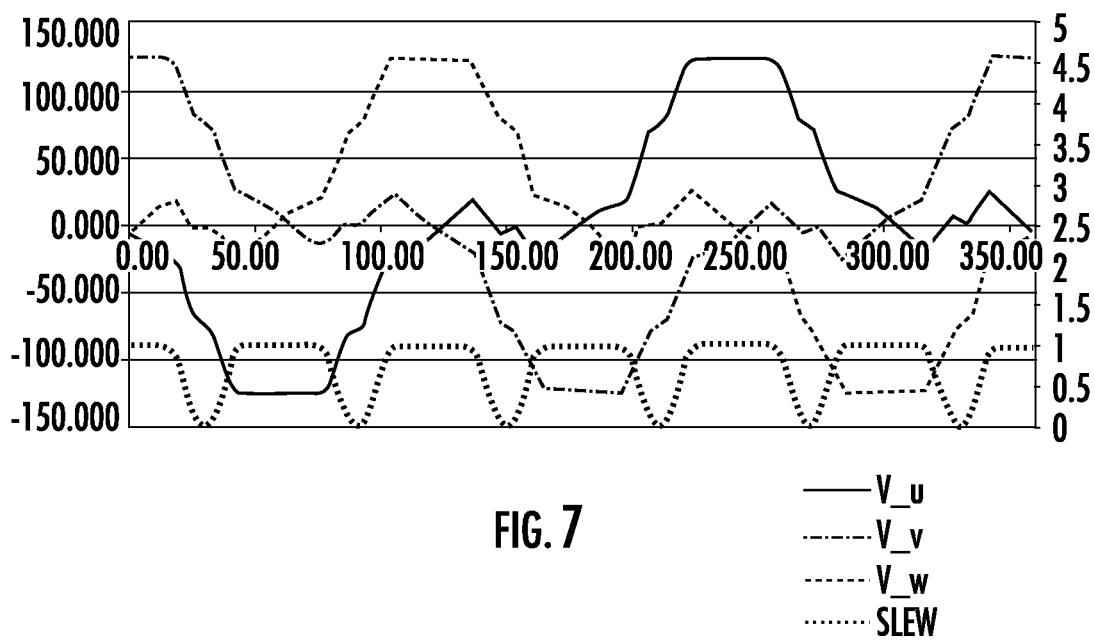
FIG. 7 illustrates the output AC voltages when using the Slew Controlled Edge Reduction technique.

FIG. 7 illustrates the output AC voltages when using the new modulation technique, which we shall refer to as Slew Controlled Edge Reduction (SCER). In this figure, the U phase is being modulated such that, when it is the most positive voltage between all the phases, a common mode component voltage is applied such that it is clamped at the positive supply rail for a portion of the output angle, and when it is the most negative voltage between all the phases, a common mode component voltage is applied such that it is clamped at the negative supply rail for a portion of the output angle. Similarly, the common mode component voltage is applied to the V and W phases when they become the most positive phase and the most negative phase such that they are also clamped respectively to the positive or negative supply rail for a portion of the output angle.

As can be seen from FIG. 7, the common mode component voltage is varied by use of a Slew Value, which is a scalar factor varying between 0 (where the common mode component voltage is 0) and 1 (where the common mode component voltage is fully used). Varying the Slew Value over the output angle thus enables the amount of common mode component voltage to be varied over the output angle. As such, one may choose the output angles over which the common mode component voltage is fully on (and thus a respective output phase voltage is clamped to the respective supply rail), the output angles over which the common mode component voltage is off (and thus the modulation scheme resorts to the underlying scheme being used without clamping, for example SVM or other modulation schemes) and over how many degrees of angle the common mode component voltage is changed from minimum to maximum or vice versa.

As such the SCER technique enables the rising and falling edges between the underlying modulation scheme (for example SVM) and the clamping scheme (where the output voltages are clamped in turn to the positive and negative supply rails) to be softened to reduce the NVH and EMI issues often associated with the pure clamping technique.

Figure 8:
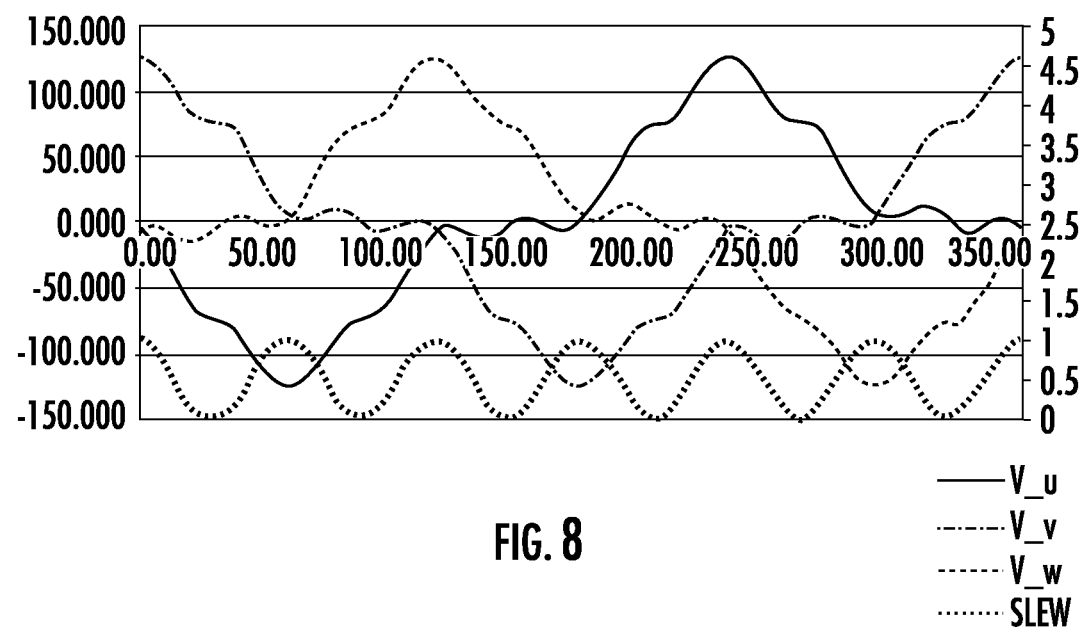
FIG. 8 illustrates the output AC voltages when using the Slew Controlled Edge Reduction technique where the Slew is varied differently to that of FIG. 7.

FIG. 8 illustrates the output AC voltages when using the Slew Controlled Edge Reduction technique where the Slew is varied differently to that of FIG. 7. In this example, it can be seen that the shape of the Slew Value is adjusted similar to a circular function across the output angles. As such, the time spent transitioning between the underlying modulation scheme and the clamping scheme is relatively long, so the rising and falling edges of the output AC voltages are shallow. As such, adjusting the common mode control voltage using such a slew value shape would result in very low NVH and EMI compared to a pure bus clamping method. However, the time spent at the positive and negative supply rails is minimised, so there would be little benefit to the reduction in switching losses in this case since there will be very little time when the switches for the respective phases stop switching.

Figure 9:
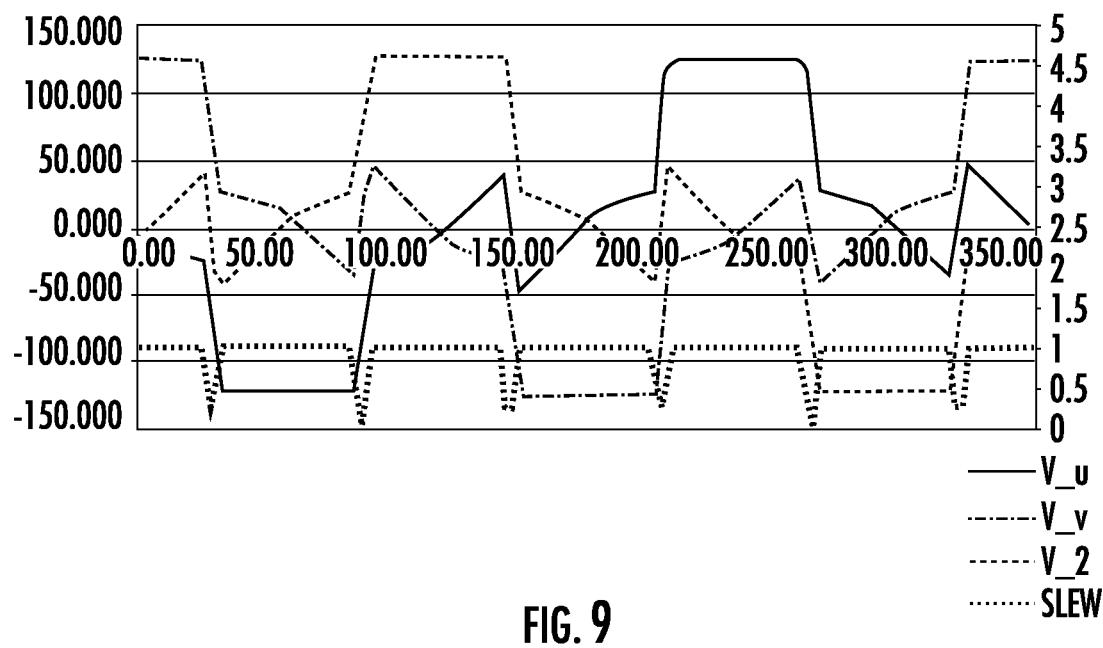
FIG. 9 illustrates the output AC voltages when using the Slew Controlled Edge Reduction technique where the Slew is varied differently to that of FIGS. 7 and 8.

FIG. 9 illustrates the output AC voltages when using the Slew Controlled Edge Reduction technique where the Slew is varied differently to that of FIGS. 7 and 8. In this example, it can be seen that the shape of the Slew Value is very rapidly adjusted between a minimum value and its maximum value. As such, the time spent transitioning between the underlying modulation scheme and the clamping scheme is very rapid, so the rising and falling edges of the output AC voltages are very steep. Adjusting the common mode voltage using such a slew value shape would result in higher NVH and EMI compared to that of FIGS. 7 and 8. However, the time spent at the positive and negative supply rails is maximised, so there would be a larger reduction in the switching losses compared to FIGS. 7 and 8.

As can be seen, there is a trade-off between the time spent by the output AC voltages at the positive and negative supply rails, which affects the reduction in switching losses, and the time spent getting to the supply rail, which affects the NVH and EMI.

The Slew Value (and thus the common mode component voltage) may be varied over the output AC voltage angles using any shape as desired by the intended purpose of the technique. For example, the transition of the slew value (and thus the common mode component voltage between its minimum and maximum) may occur linearly, exponentially, or logarithmically. The transition of the slew value (and thus the common mode component voltage between its minimum and maximum) may even take the shape of a portion of a circular function.

We will now describe the preferred shape of the Slew Value (and thus common mode component voltage amplitude) over the output AC voltage angles using the SCER technique.

Clamping any one of the phases to the positive supply rail or negative supply rail means that the other phases need also to be raised or lowered in amplitude appropriately in order that the line to line voltage remains sinusoidal for the electrical load.

$$V_u = \sin(\theta) + V_c$$

$$V_v = \sin(\theta + 120°) + V_c$$

$$V_w = \sin(\theta + 240°) + V_c$$

Where $V_u$ is the U phase voltage at a particular angle, $V_v$ is the V phase voltage at a particular angle (phase shifted by 120° from the U phase) and $V_w$ is the W phase voltage at a particular (phase shifted by 240° from the U phase). $V_c$ is the common mode component voltage.

If we want $V_u$ to be equal to the positive DC supply rail, then we set $V_c$ to a value that will make up the difference.

$$V_c = (\sin(\theta) + V_{DC}) * \text{SlewValue}$$

Where $V_{DC}$ is the DC supply rail voltage. This equation shows the value of $V_{DC}$ when clamping to the positive supply rail. When clamping to the negative supply rail, the $V_{DC}$ value for the negative supply rail is subtracted.

As discussed above, the Slew Value is a scalar value between 0 and 1 that allows control of the amplitude of $V_c$ that is applied at any particular point throughout the output AC voltage angles.

To determine the common component's value, we can utilise the following inputs:

Electrical angle θ

$V_U$, $V_V$ and $V_W$ values (as calculated by SVM)

DC bus voltages, and $V_{DC+ve}$ and $V_{DC-ve}$

The definition of the damping function we have selected:
  Which phase should be clamped in a given sector? None, U, V or W?
  Where should the damped phase be damped to? No damp, DC+ve or DC−ve?
  What is the scalar (i.e. slew value) applied to the common component? 0%, 100%, rising over time, or falling over time?

For each method, we can create a table to map each of the last three inputs for each 30-degree sector of the output AC voltage angle, for example as shown below:

|  | Sector | | | | | | | | | | | |
|---|---|---|---|---|---|---|---|---|---|---|---|---|
|  | 0 | 1 | 2 | 3 | 4 | 5 | 6 | 7 | 8 | 9 | 10 | 11 |
| Phase | V | U | U | W | W | V | V | U | U | W | W | V |
| Bus | +ve | −ve | −ve | +ve | +ve | −ve | −ve | +ve | +ve | −ve | −ve | +ve |
| Slew | Fall | Rise | Fall | Rise | Fall | Rise | Fall | Rise | Fall | Rise | Fall | Rise |

Through modulation and experimentation, it has been found that the preferred shape of the transition between the minimum and maximum values of slew value (and thus the common mode component voltage) is an S shape based on a sinusoid. This shape gives the best reduction of sharp edges in the transition (thus minimising the rise in NVH and EMI) whilst stiller permitting the maximum time with the phase clamped at the supply rails (thus reducing the switching losses for that particular phase).

Whilst in this method the output AC voltage angles have been split into 30° segments, it would be appreciated by the skilled reader that other segment sizes may be possible. However, in this case, 30° segments were chosen as the method become simpler to implement.

The Slew value being stated as "Rise" indicates that the slew value for that segment is rising from a lower value to a higher value over at least a portion of that segment, and "Fall" indicates that the slew value for that segment is falling from a higher value to a lower value over at least a portion of that segment.

Over the rise segments, the slew value may be shaped as desired, as discussed above. Preferably, the shape of the rise segment is defined by a portion of a circular function, preferably at least a rising portion of a sinusoid. Over the fall segments, the slew value may be shaped as desired, as discussed above. Preferably, the shape of the fall segment is defined by a portion of a circular function, preferably at least a falling portion of a sinusoid.

The angle of operation of the output AC voltage within a 30° segment is determined. This can, for example, be found by using the following operation:

$$\gamma = \mod\left(\frac{\theta}{30}\right)$$

Identifying which of the 30° segments we are operating in can be determined by:

$$\text{Sector} = \frac{\theta}{30} - \gamma$$

From the table above, it can then be determined which operation to perform on the Slew Value (0%, 100%, rise or fall). If the Slew Value is required to stay at 0% (equivalent to SVM), then the Slew Value is set to 0, if the Slew Value is required to stay at 100% (equivalent to bus clamped), then the Slew Value is set to 1.

If the Slew Value is required to "Rise", the Slew Value is required to rise from a lower value to its maximum value over a portion of the segment, and then remain at the maximum value for the remainder of the segment. The following rules are provided, depending on the operating angle within the segment:
- If a product of the angle of operation and a Slew Factor is less than 30°, then increase the Slew Value according to the desired shape
- If a product of the angle of operation and the Slew Factor is greater than 30°, then set the Slew Value to 1 (i.e. 100%)

The Slew Factor is a further scalar value, which enables control over the duration of the rise and fall within the segment.

For a rise operation, the preferred shape may be represented as:

SlewValue=−0.5*cos(6*(Slew$_{Factor}$*γ))+0.5

As can be seen, at its heart, the Slew Value's shape is defined by a circular function having a fundamental frequency that is 6 times the frequency of the output AC voltage.

The Slew Factor provides control over its period such that the rate at which the function causes the Slew Value (and thus the common mode component voltage) to rise.

It would be apparent to the skilled reader that this Slew Value may be represented mathematically in other ways, whilst still achieving the same result.

If the Slew Value is required to "Fall", the Slew Value is required to start at its maximum value for a portion of the segment, and then fall from its maximum value to a lower value over the remaining portion of the segment. The following rules are provided, depending on the operating angle within the segment:

- If the operating angle is less than a "Slew Offset", which is used to define the starting angle of the falling portion within the segment, then the Slew Value is held at its maximum
- If the operating angle is greater than the "Slew Offset", then decrease the Slew Value according to the desired shape The Slew Offset defines the starting angle and/or duration of the falling portion, and is proportional to the Slew Factor. The Slew Offset may be defined for the scheme using 30° segments as:

$$Slew_{Offset} = 30° - \frac{30°}{Slew_{Factor}}$$

For a fall operation, the preferred shape may be represented as:

Slew=0.5*cos(6*Slew$_{Factor}$*(γ−Slew$_{Offset}$))+0.5

As can be seen, at its heart, the Slew Value's shape over the fall function is defined by a circular function having a fundamental frequency that is 6 times the frequency of the output AC voltage. The Slew Factor provides control over its period such that the rate at which the function causes the Slew Value (and thus the common mode component voltage) to fall. The Slew Offset provides a variable phase shift, dependent on the Slew Factor.

Again, it would be apparent to the skilled reader that this Slew Value may be represented mathematically in other ways, whilst still achieving the same result.

In any of the rise or fall operations, the Slew Factor value may be chosen depending on a number of factors, for example the intended modulation index of the inverter and/or the operating frequency of the output AC voltages. Characterisation of the electrical load may be performed under different operating conditions to identify operating points at which implementing the above mentioned SCER technique would provide maximum benefit. From the characterisation, a table of Slew Factors may be collated and referenced during operation of the electrical load as either a lookup table or other referencing methods.

Similarly, whether or not to implement the SCER technique may be based on knowledge of the operating point of the electrical load, the modulation index of the inverter and/or the frequency of the output AC voltage. This could be determined from real-time measurements, or based on a lookup scheme from a table of characterised operating values of the electrical load. Transitioning between SCER or SVM (or whatever underlying modulation scheme is being used) may be performed on a PWM period by PWM period basis if required. Furthermore, the technique is also usable in modulation indices that are greater than one.

Figure 10:
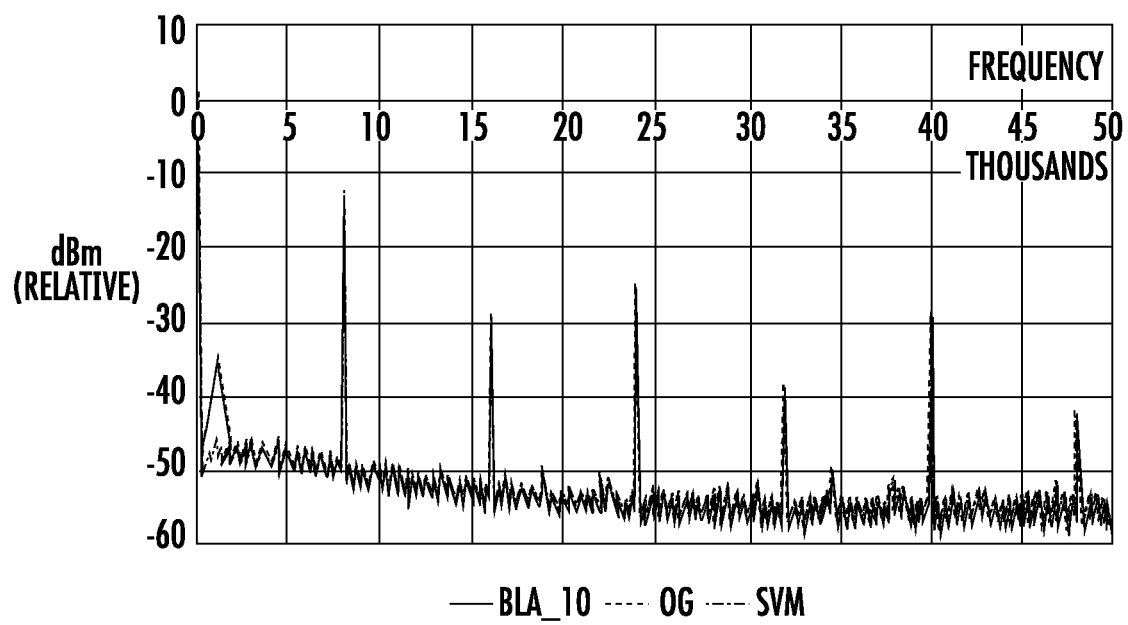
FIG. 10 shows a spectrum of the star point measured common mode current of an electrical load between 0 Hz and 50 kHz for a system using SVM, the prior art bus clamping technique and the technique described herein.

FIG. 10 shows a spectrum of the star point measured common mode current between 0 Hz and 50 kHz for a system using SVM, the prior art bus clamping technique and the SCER technique described above at a modulation index of 0.82. SVM is shown in black for reference. OG (in blue) is the prior art bus clamp techniques. SCER (slew controlled edge reduction) is shown in orange. As can be seen, resonant peaks occur throughout the frequency spectrum. However, NVH issues generally are more noticeable at the lower frequencies, which can result in noise and vibration from the electrical load being powered by the inverter.

Figure 11:
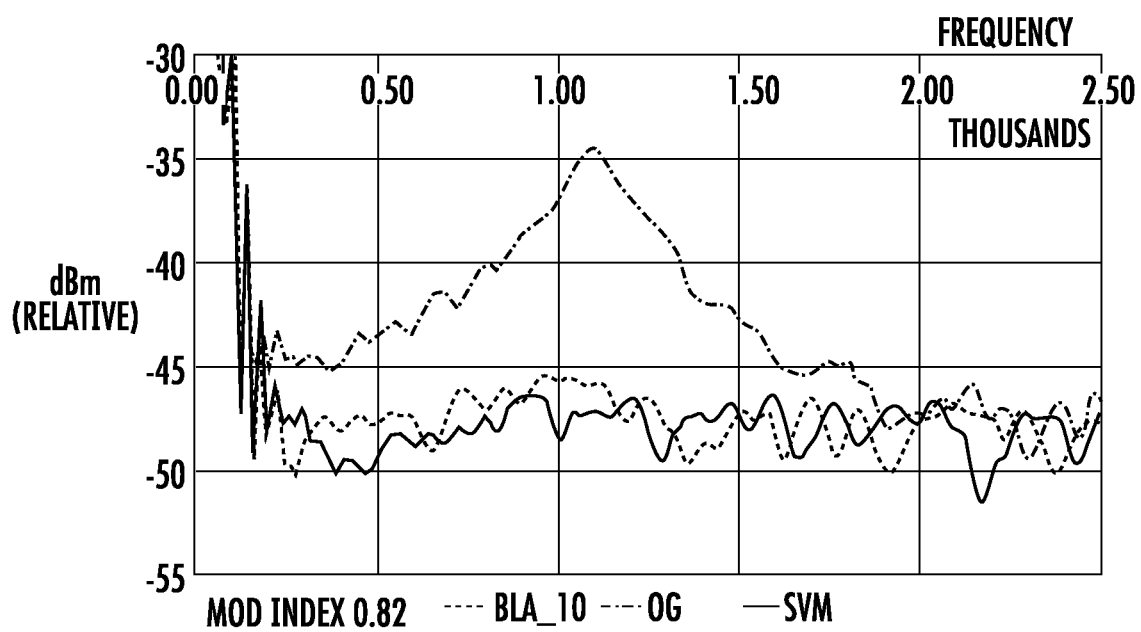
FIG. 11 shows the spectrum of the star point as in FIG. 10, but for frequencies between 0 Hz and 25 kHz.

FIG. 11 shows the spectrum of the star point as in FIG. 10, but for frequencies between 0 Hz and 25 kHz. As can be seen, a large amount of noise is present around 1.2 kHz in the plot for the prior art bus clamping techniques, whereas there is no noticeable increase in the noise for the same frequencies using the SCER technique. The noise levels appear similar to those of standard SVM modulation schemes, but whilst providing the benefit of a reduction in the switching losses since the phases in turn are clamped at the respective supply rails.

Figure 12:
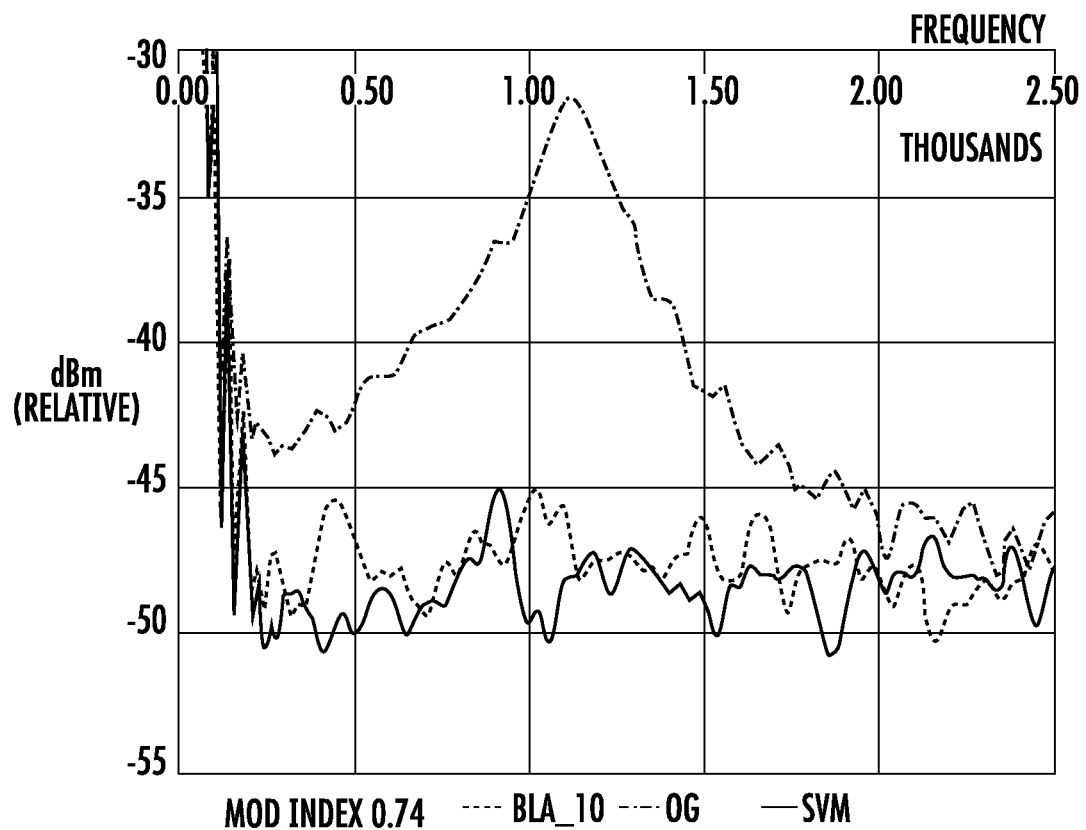
FIG. 12 shows the spectrum of the star point as in 11, but for a lower modulation index.
Figure 13:
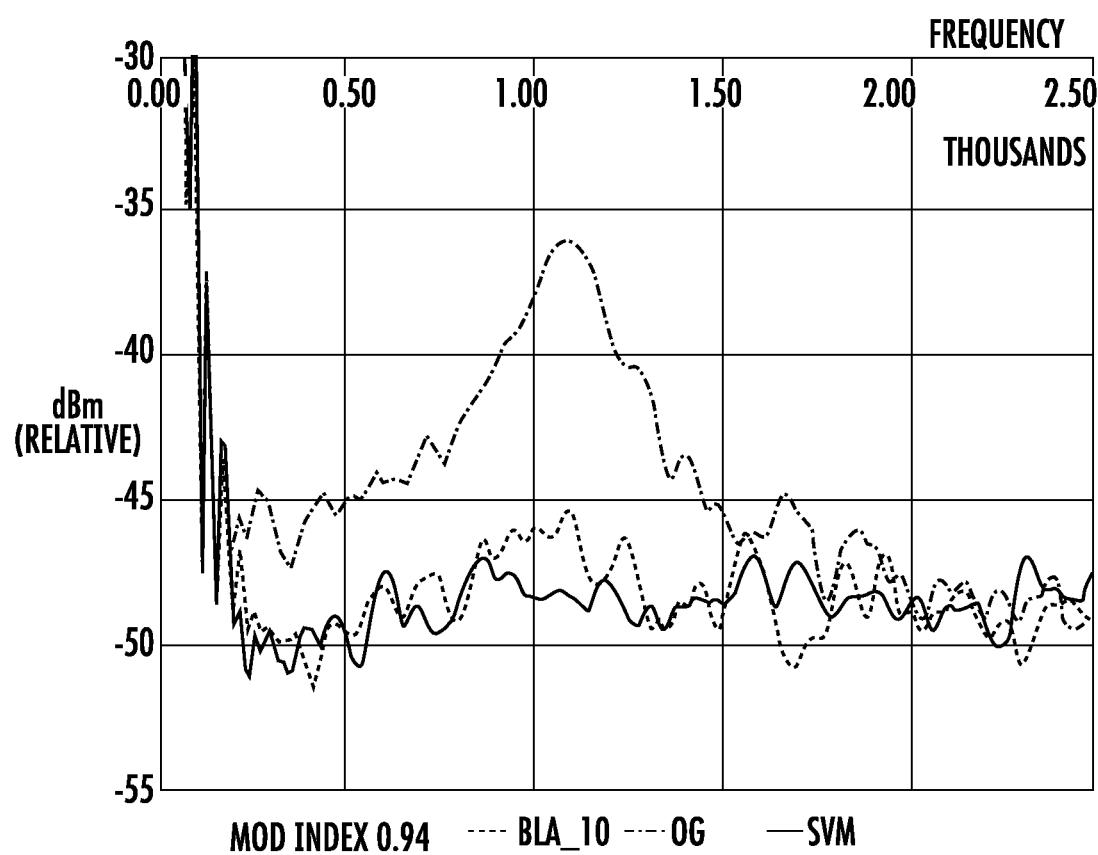
FIG. 13 shows the spectrum of the star point as in 11, but for a higher modulation index.

FIG. 12 shows the spectrum of the star point as in 11, but for a lower modulation index, in this case 0.74. FIG. 13 shows the spectrum of the star point as in 11, but for a higher modulation index, in this case 0.94. As can be seen in both cases, the noise levels for the prior art bus clamping technique has elevated noise levels around the 1.2 kHz frequencies, whereas the SCER technique described above has a noise level similar to that of standard SVM, but whilst still providing the benefit of a reduction in the switching losses since the phases in turn are clamped at the respective supply rails.

The SCER technique also reduces coincident switching which in turn helps reduce EM emissions.

In experimentation and simulation it has been observed that the SCER technique achieves a 30% reduction in switching loss (compared to 33% in prior art bus clamping methods) but with very low effect on NVH (the disadvantage of prior art methods).

Figure 1:
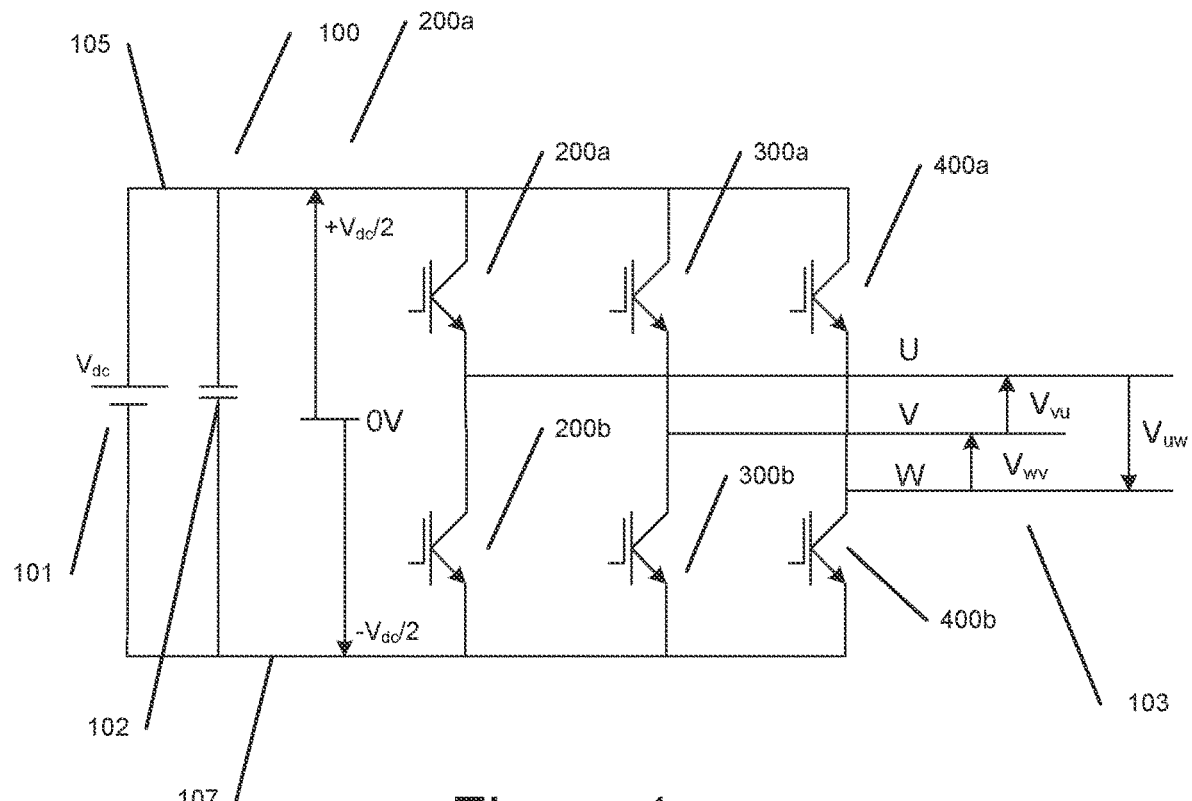
FIG. 1 shows a simplified schematic of an inverter.
Figure 2:
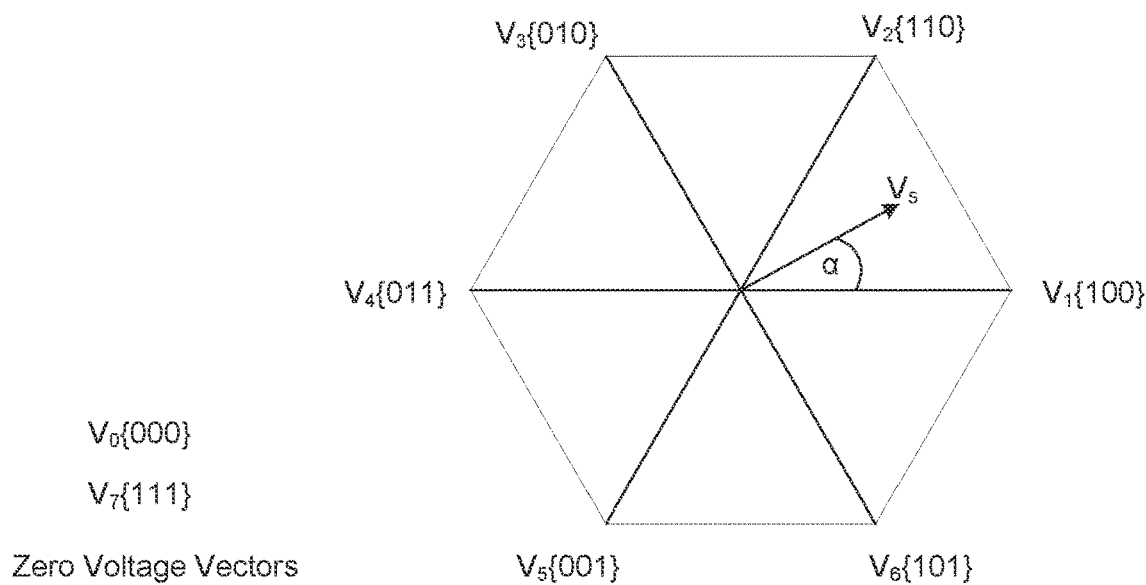
FIG. 2 shows a vector representation of the switching states of the inverter of FIG. 1.
Figure 3:
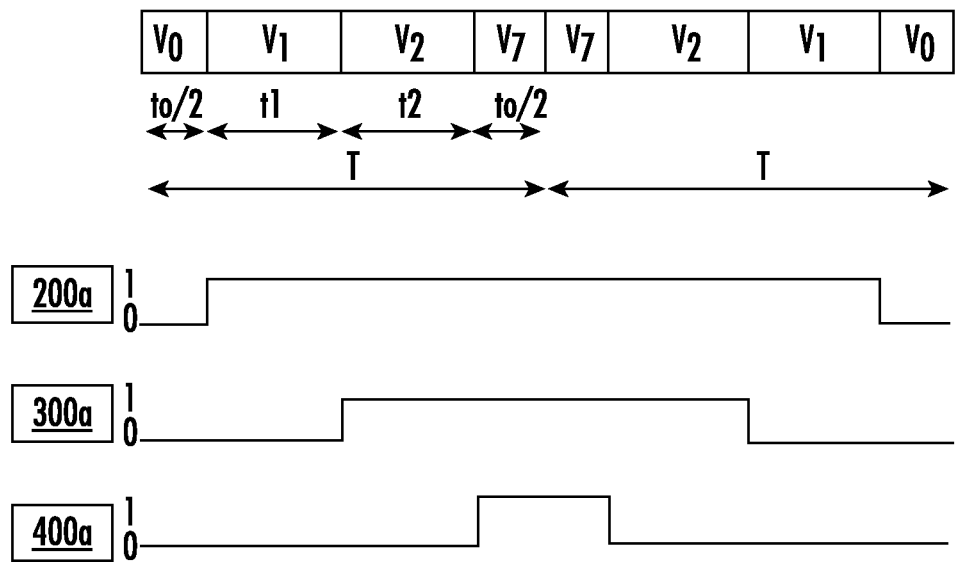
FIG. 3 shows an example of pulse width Space Vector Modulation (SVM) over one Pulse Width Modulation switching cycle.
Figure 4:
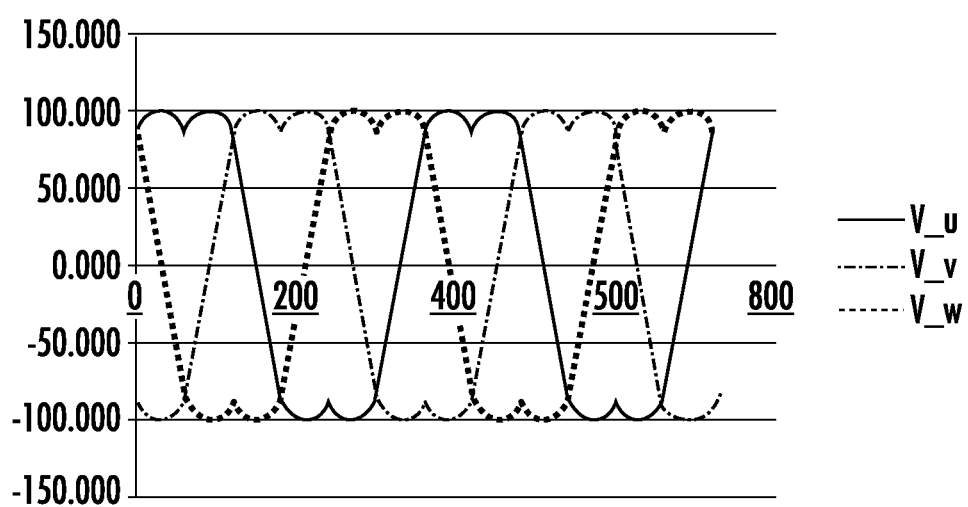
FIG. 4 shows phase voltages (with respect to the 0V line) at the output of the inverter of FIG. 1.
Figure 5:
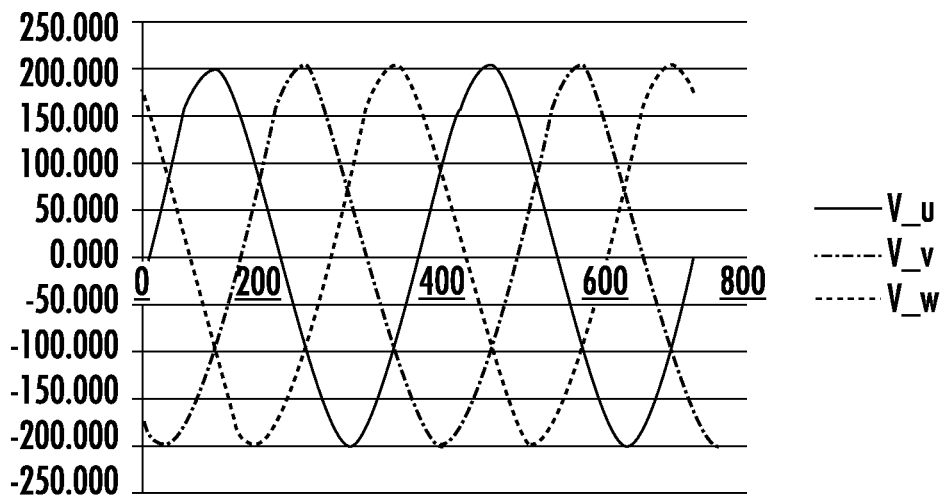
FIG. 5 shows the resulting line to line voltages at the output of the inverter of FIG. 1 as seen by the electrical load.
Figure 6:
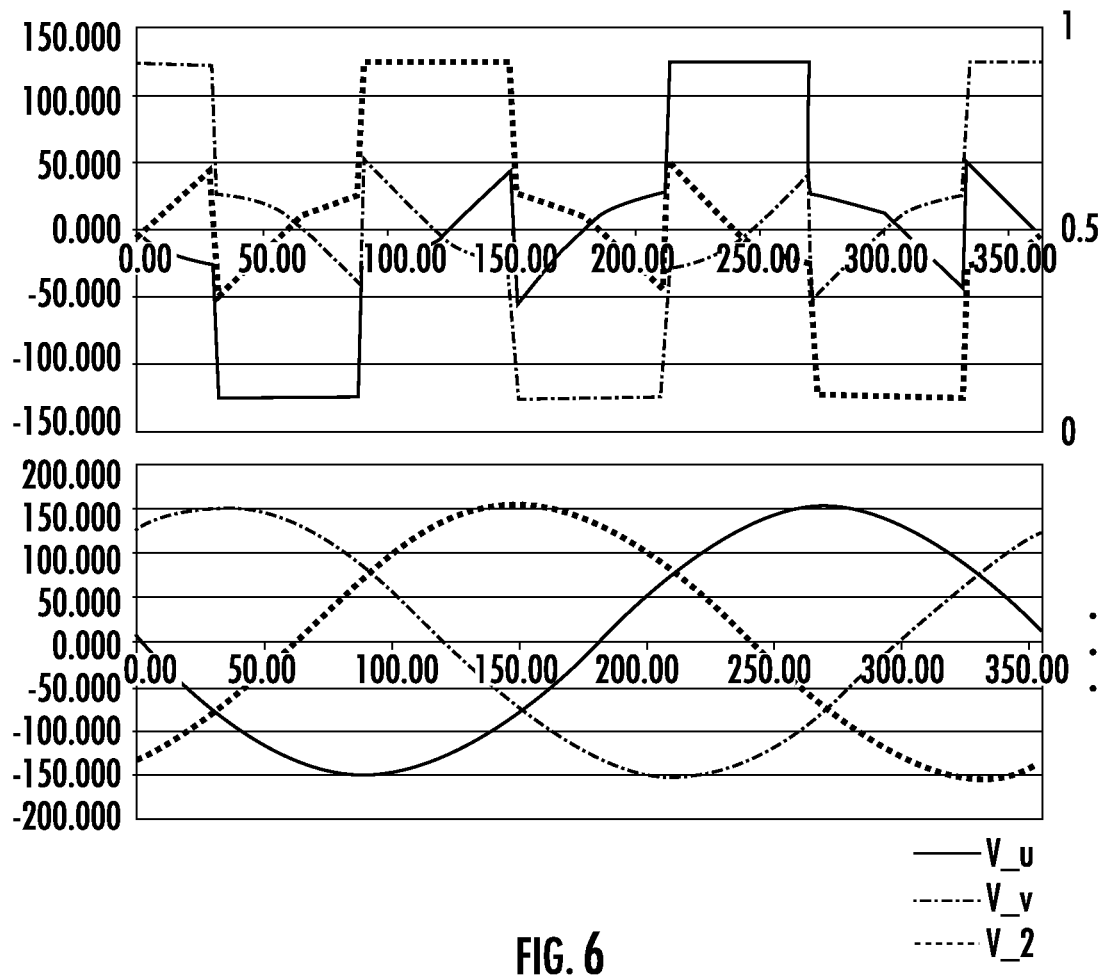
FIG. 6 illustrates the prior art bus clamping technique.

All of the above methods may be implemented in a controller, in hardware or software, coupled to the controllable switches as shown for example in FIG. 1. However, such a controller is not limited to the physical arrangement of switches in FIG. 1. For example, whilst FIG. 1 is a simplified prior art converter/inverter on which the above-mentioned modified method may be implemented, it is noted that this method is also applicable to multi-level converters, that is, converters having more than the two DC voltages shown in FIG. 1.

In any of the above, electrical load can be taken to mean a multi-phase electrical load. One such example is an electrical motor or an electrical generator, although the SCER technique is applicable to any kind of multi-phase electrical load.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of generating a three-phase voltage for powering an electrical load, the method comprising:
receiving an input voltage from a voltage source and controlling a plurality of switches, using Pulse Width Modulation (PWM) over a plurality of PWM periods, to generate a three phase AC output for an electrical load, the input voltage having a positive supply rail voltage and a negative supply rail voltage, each of the three phase AC outputs having an amplitude and angle that varies over a plurality of segments, each segment representing a period of angular position, and wherein each of the three phase AC outputs are offset from one another in angle;
for each segment:
identify which of the three phase AC output voltages approaching the positive supply rail has the most positive voltage, or which of the three AC output voltages approaching the negative supply rail has the most negative voltage;
control the plurality of switches to apply a common mode component voltage to each of the three phases within the respective segment, the common mode component voltage having a maximum amplitude that is sufficient to clamp the respective identified phase voltage to the respective positive supply rail or the respective negative supply rail, wherein the common mode component voltage amplitude is varied over the angle within the respective segment between a minimum value and the maximum value, and wherein varying the common mode component voltage amplitude controls a slew rate of respective rising or respective falling edges of the three phase AC output voltages.

2. The method according to claim 1, wherein the common mode component voltage is varied over the angle within the respective segment between the minimum value and the maximum value using a slew value, the slew value comprising a variable scalar value ranging between a respective minimum slew value and a respective maximum slew value within the respective segment.

3. The method according to claim 2, wherein the transition of the slew value between its minimum and maximum values has a shape defined by a portion of a circular function.

4. The method according to claim 3, wherein the duration of the first section of the segment is based on a Slew Factor, the Slew Factor being a scalar value to control the duration of the transition between the minimum and maximum values.

5. The method according to claim 4, wherein the slew value over the first section is defined by:

$$\text{Slew Value}=-0.5*\cos(6*(\text{SlewFactor}*\gamma))+0.5$$

Where $\gamma$ defines the AC output voltage angular position.

6. The method according to claims 3, wherein the slew value has a maximum value for a second section of the respective segment, the first and second sections being consecutive.

7. The method according to claim 3, wherein, for an AC output voltage angular position within a first section of the respective segment, the segment having 30° of angular positions, the slew value has a maximum value for the first section.

8. The method according to claim 7, wherein, the slew value has a shape defined by a falling portion of a sinusoid between its maximum value and its minimum value over the second section, wherein the first and second sections are consecutive.

9. The method according to claim 8, wherein the duration of the second section is based on a Slew Factor, the Slew Factor being a scalar value to control the duration of the transition between the minimum and maximum values.

10. The method according to claim 9, wherein slew value is defined by:

$$\text{SlewValue}=0.5*\cos(6*(\text{SlewFactor}*(\gamma-\text{SlewOffset})))+0.5$$

Where $\gamma$ defines the AC output voltage angular position, and SlewOffset is a starting angle of the second section.

11. An inverter for generating a three-phase voltage for powering an electrical load, the inverter comprising:
an input for receiving input voltages, the input voltage having a positive supply rail voltage and a negative supply rail voltage;
three AC outputs, one per phase, for outputting a three phase AC output voltage for powering an electrical load;

a plurality of switches connected between the input voltages and the three AC outputs and being arranged to generate the three AC output voltages;

a controller coupled to the plurality of switches for controlling the plurality of switches, using Pulse Width Modulation (PWM) over a plurality of PWM periods, to generate a three phase AC output for the electrical load, each of the three phase AC outputs having an amplitude and angle that varies over a plurality of segments, each segment representing a period of angular position, and wherein each of the three phase AC outputs are offset from one another in angle;

wherein the controller is configured to:
for each segment:
identify which of the three phase AC output voltages approaching the positive supply rail has the most positive voltage, or which of the three AC output voltages approaching the negative supply rail has the most negative voltage;
control the plurality of switches to apply a common mode component voltage to each of the three phases within the respective segment, the common mode component voltage having a maximum amplitude that is sufficient to clamp the respective identified phase voltage to the respective positive supply rail or the respective negative supply rail, wherein the common mode component voltage amplitude is varied over the angle within the respective segment between a minimum value and the maximum value, and wherein varying the common mode component voltage amplitude controls a slew rate of respective rising or respective falling edges of the three phase AC output voltages.

12. The inverter according to claim 11, wherein the common mode component voltage is varied over the angle within the respective segment between the minimum value and the maximum value using a slew value, the slew value comprising a variable scalar value ranging between a respective minimum slew value and a respective maximum slew value within the respective segment.

13. The inverter according to claim 12, wherein the controller controls the transition of the slew value between its minimum and maximum values using a shape defined by a portion of a circular function.

14. The inverter according to claim 13, wherein the controller controls the duration of the first section of the segment based on a Slew Factor, the Slew Factor being a scalar value to control the duration of the transition between the minimum and maximum values.

15. The inverter according to claim 14, wherein the controller controls the slew value over the first section using:

Slew Value=−0.5*cos(6*(SlewFactor*γ))+0.5

Where γ defines the AC output voltage angular position.

16. The inverter according to claims 13, wherein the controller controls the slew value to have a maximum value for a second section of the respective segment, the first and second sections being consecutive.

17. The inverter according to claim 13, wherein, for an AC output voltage angular position within a first section of the respective segment, the segment having 30° of angular positions, the controller controls the slew value to have a maximum value for the first section.

18. The inverter according to claim 17, wherein the controller controls the slew value to have a shape defined by a falling portion of a sinusoid between its maximum value and its minimum value over the second section, wherein the first and second sections are consecutive.

19. The inverter according to claim 18, wherein the controller controls the duration of the second section based on a Slew Factor, the Slew Factor being a scalar value to control the duration of the transition between the minimum and maximum values.

20. The inverter according claim 19, wherein the controller controls the slew value using:

SlewValue=0.5*cos(6*(SlewFactor*(γ−SlewOffset)))+0.5

Where γ defines the AC output voltage angular position, and SlewOffset is a starting angle of the second section.

21. The inverter according to claim 20, wherein the starting angle of the second section is defined by the AC output voltage having an angular position that is greater than a difference between the duration of a segment and a quotient of the duration of a segment and the Slew Factor.

* * * * *